US010940958B2

(12) United States Patent
Kovach et al.

(10) Patent No.: US 10,940,958 B2
(45) Date of Patent: Mar. 9, 2021

(54) HEATING LAYER FOR FILM REMOVAL

(71) Applicant: The Boeing Company, Chicago, IL (US)

(72) Inventors: Daniel J Kovach, Renton, WA (US); Gary E Georgeson, Tacoma, WA (US); Robert J Miller, Fall City, WA (US); Jeffrey D Morgan, Auburn, WA (US); Diane Rawlings, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 410 days.

(21) Appl. No.: 15/716,700

(22) Filed: Sep. 27, 2017

(65) Prior Publication Data

US 2018/0016028 A1 Jan. 18, 2018

Related U.S. Application Data

(62) Division of application No. 13/911,778, filed on Jun. 6, 2013, now abandoned.

(51) Int. Cl.
*B32B 43/00* (2006.01)
*B64D 45/02* (2006.01)
(Continued)

(52) U.S. Cl.
CPC .......... *B64D 45/02* (2013.01); *B29C 63/0013* (2013.01); *B32B 43/006* (2013.01);
(Continued)

(58) Field of Classification Search
CPC . B32B 38/10; B32B 43/006; Y10T 156/1158; Y10T 156/1917; H05B 6/02; H05B 6/10; C08L 11/00
See application file for complete search history.

(56) References Cited

U.S. PATENT DOCUMENTS

| 2,393,541 A | 1/1946 | Kohler |
| 5,208,443 A | 5/1993 | McGaffigan |
(Continued)

FOREIGN PATENT DOCUMENTS

| DE | 10210661 | 5/2003 |
| EP | 0440410 | 8/1991 |
(Continued)

OTHER PUBLICATIONS

Maenosono, Shinya et al; "Theoretical Assessment of FePt Nanoparticles as Heating Elements for Magnetic Hyperthermia;" IEEE Transactions on Magnetics; vol. 42, No. 6; Jun. 2006, pp. 1638-1642.
(Continued)

*Primary Examiner* — Mark A Osele
*Assistant Examiner* — Nickolas R Harm
(74) *Attorney, Agent, or Firm* — Parsons Behle & Latimer

(57) ABSTRACT

Embodiments of the presently disclosed system include a thin thermoplastic or thermosetting polymer film loaded with non-polymeric inclusions that are susceptible to heating under a time-varying magnetic field. Insertion of this additional heating layer into a structural or semi-structural heterogeneous laminate provides an "on-demand" de-bonding site for laminate deconstruction. For example, in some embodiments when the heating layer is inserted between a cured Carbon-Fiber Reinforced Plastic (CFRP) layer and a Polymeric/Metallic film stackup layer, the heating layer can be selectively heated above its softening point (e.g., by using energy absorbed from a locally-applied time-varying magnetic field) to allow for ease of applique separation from the CFRP layer.

20 Claims, 4 Drawing Sheets

(51) Int. Cl.
*H01B 5/00* (2006.01)
*B29C 63/00* (2006.01)
*C08K 3/08* (2006.01)
*B32B 37/12* (2006.01)
*B32B 38/10* (2006.01)
*H05B 6/10* (2006.01)
*H05B 6/02* (2006.01)
*C08L 11/00* (2006.01)

(52) U.S. Cl.
CPC ............... *C08K 3/08* (2013.01); *H01B 5/00* (2013.01); *B32B 37/12* (2013.01); *B32B 38/10* (2013.01); *B32B 2307/208* (2013.01); *B32B 2405/00* (2013.01); *C08K 2201/01* (2013.01); *C08L 11/00* (2013.01); *H05B 6/02* (2013.01); *H05B 6/10* (2013.01); *Y10T 156/10* (2015.01); *Y10T 156/1158* (2015.01); *Y10T 156/1917* (2015.01); *Y10T 428/24843* (2015.01)

(56) References Cited

U.S. PATENT DOCUMENTS

| | | |
|---|---|---|
| 5,833,795 A | 11/1998 | Smith et al. |
| 6,056,844 A | 5/2000 | Guiles et al. |
| 7,147,742 B2 | 12/2006 | Kirsten |
| 7,277,266 B1 | 10/2007 | Le et al. |
| 7,525,785 B2 | 4/2009 | Rawlings |
| 2003/0152766 A1 | 8/2003 | Vargo et al. |
| 2005/0039848 A1 | 2/2005 | Kirsten |
| 2006/0162855 A1 | 7/2006 | Dabelstein et al. |
| 2006/0255945 A1 | 11/2006 | Egbert |
| 2008/0144249 A1 | 6/2008 | Rawlings |
| 2010/0316845 A1 | 12/2010 | Rule et al. |
| 2012/0126381 A1 | 5/2012 | Uenda et al. |
| 2012/0231197 A1 | 9/2012 | Mitchell |

FOREIGN PATENT DOCUMENTS

| | | |
|---|---|---|
| EP | 0522663 | 1/1993 |
| EP | 1935631 | 6/2008 |
| EP | 2363429 | 9/2011 |
| JP | H07145357 | 6/1995 |
| JP | H07179828 | 7/1995 |
| JP | 2001354915 | 12/2001 |
| JP | 2008541616 | 11/2008 |
| JP | 2010106193 | 5/2010 |
| WO | WO19930025375 | 12/1993 |
| WO | WO199838243 | 9/1998 |
| WO | WO2006124270 | 11/2006 |
| WO | WO2008118230 | 10/2008 |
| WO | WO2010088425 | 8/2010 |
| WO | WO2010121044 | 10/2010 |
| WO | WO2010121058 | 10/2010 |
| WO | WO2011055022 | 5/2011 |
| WO | WO2011097001 | 8/2011 |

OTHER PUBLICATIONS

Wikipeida; "Superparamagnetism;" http://en.wikipedia.org/wiki/superparamagnetic; downloaded Jan. 11, 2013, 6 pp 11.
Canadian Intellectual Property Office; Office Action; Canadian Patent Application No. 2,847,128; dated Mar. 7, 2016.
Canadian Intellectual Property Office; Office Action; Canadian Patent Application No. 2,847,128; dated May 12, 2015.
European Patent Office, Extended European Search Report; European Patent Application No. EP 14162401.5; dated Oct. 1, 2014.
US Patent and Trademark Office; Office Action; U.S. Appl. No. 13/911,778; dated Jan. 15, 2016.
US Patent and Trademark Office; Office; U.S. Appl. No. 13/911,778, filed Jan. 26, 2017
US Patent and Trademark Office; Final Office Action; U.S. Appl. No. 13/911,778; dated Aug. 10, 2016.
Japanese Patent Office; Notice of Reasons for Rejection; Patent Application No. JP2014-093179; dated Oct. 30, 2018.
European Patent Office; Official Communication; EP Patent Applicaton No. 14162401.5; dated Jun. 26, 2018.
Japanese Patent Office; Notice of Reasons for Rejection; Patent Application No. JP2014-093179; dated Jan. 30, 2018.

HEATING LAYER FOR FILM REMOVAL

CROSS-REFERENCE TO RELATED APPLICATIONS

This application claims priority to and the benefit of U.S. patent application Ser. No. 13/911,778 filed on Jun. 6, 2013, published as U.S. Patent App. Pub. No. 2014/0363637 and entitled "Heating Layer for Film Removal," the contents of which are hereby incorporated by reference in their entirety.

FIELD

The present disclosure relates generally to the fields of polymer film or applique construction, application, and removal. More specifically the disclosure relates to using time-varying magnetic fields to heat a layer containing magnetic susceptors comprising at least a portion of the film or applique which facilitates bonding and de-bonding of the polymer film or applique from a surface. The layer containing the magnetic susceptors may be the bonding layer itself or may be in proximity to another bonding or adhesive layer.

BACKGROUND

In aviation, as well as other fields, it is often desirable to provide mechanisms to protect against environmental hazards such as lightning attachment. For example, see U.S. Pat. No. 7,277,266, titled Lightning Protection System For Composite Structure, which is incorporated herein by reference. This may be of particular importance for non-metallic structures, such as Carbon-Fiber Reinforced Plastic (CRFP). Some existing mechanisms that have proven useful in mitigating so-called Direct Effects damage to non-metallic structures subjected to lightning attachment include heterogeneous film stackups composed of a solid or patterned metallic conductor layer bonded to a polymeric dielectric layer. For example, see the above-noted U.S. Pat. Nos. 7,277,266 and 7,867,621, titled Wide Area Lightning Diverter Overlay, which is incorporated herein by reference. Such a configuration helps confine the lightning to the conductor or patterned layer and helps prevent damage to the non-metallic structures beneath.

Other possible uses for an applique or polymer multilayer film may include serving as a layer on the exterior of a surface to provide environmental resistance (e.g., in lieu of paints), or to provide aerodynamic drag resistance (e.g., using riblets formed in the exterior layer). Other uses also exist.

Applique materials currently being used may include multiple layers electrically connected to a grounding system as described in the above-noted U.S. Pat. Nos. 7,277,266, and 7,867,621. Other applique types may include only polymeric films and layers. Still other appliques may include the following layers: decorative film or layer, or fluoropolymer (e.g., paint replacement), conductive layers consisting of solid copper foil, solid aluminum foil, expanded copper foil (ECF), expanded aluminum foil (EAF), vapor deposition of copper or aluminum, and carbon nanotube materials. In some embodiments, the dielectric layer may consist of a dielectric barrier between the conductor layer and the structure. Exemplary materials currently used are, fluoropolymer, polyether ether ketone (PEEK), fiberglass epoxy laminate, or dielectric materials.

The form in which these multi-layer films have been typically deployed to structures has been as appliques which, in the past, typically, have comprised solid films coated on one surface with a pressure-sensitive adhesive (PSA). This form allows the applique to be removed from the surface it had been adhered to relatively easily. However, in an aerospace application, this ease of removal must be controlled so that adhesion can be maintained over all environmental conditions, like those expected of commercial and military aircraft deployed throughout the world. Exterior coatings like appliques do not today survive the full deployed lifetime of an aircraft, so they must occasionally be renewed. This is primarily due to effects of UV and gouging from repeated impacts. Local removal of the applique is also required in the case of damage from impact, rain, erosion, abrasion, or lightning attachment. Lightning attachment will likely cause local destruction of the film in the attachment region (and at electrical connects, see, e.g., U.S. Pat. No. 7,277,266, in regions where current flows from one stackup of applique material to another). Appliques are typically adhesively bonded to a surface using a PSA and applying appropriate pressure. Heating is used today to aid in removal of the PSA-bonded appliques.

Bonding, or welding, these multilayer films to the structures they are intended to protect (using a thermoplastic layer, or film adhesive, for example), may provide for a bond that is more durable to aircraft fluids such as Skydrol, and allow the multilayer film to better endure impacts, rain erosion, gouging, and thermal cycling better than the typical PSA. However, a thermoplastic adhesive bond typically would greatly increase the amount of heat required for removal of the multilayer film or applique from the structure, and would be susceptible to large amounts of thermoplastic residue being left behind if the temperature was not accurately controlled.

Likewise, current applique installation techniques have many drawbacks. For example, typically, existing techniques for application of applique materials is a labor intensive process requiring the hand lay down of the materials, applying pressure to obtain adhesion, and aligning of the material to alleviate any bubbles, wrinkles, or other defects. As part of the application process all edges need to be sealed in order to maintain proper adhesion to the structure and to stop penetration of any water or air under the applique material. Other disadvantages and drawbacks of current systems also exist.

SUMMARY

Accordingly, there is a need for providing films or appliques that adhere to surfaces with sufficient bond strength appropriate for the intended environment, and with a corresponding de-bonding strength that facilitates removal and replacement as desired. For example, an applique that is bonded to a surface with a PSA may be enhanced with an integral heating element, such as a magnetic susceptor layer, to improve both installation and removal.

As disclosed herein, some embodiments provide an applique with an intermediate heating layer having a thermally reducible bond strength between the metal/polymer film and the underlying structure on which the film is applied. In such embodiments, the heating layer may thus enable the bond between the applique and structure to be more easily broken, at the discretion of an operator. One advantage of the disclosed system and method is that it may enable the more widespread use of metal/polymer films as protection for mitigating the direct effects of lightning strikes or other environmental conditions.

Accordingly, disclosed embodiments include a lightning strike protection applique having a lightning strike protection layer with a conductor layer and a dielectric layer. Embodiments of the applique also include a heating layer comprising thermoplastic or thermosetting polymer and magnetic material, and an adhesive layer.

Other disclosed embodiments include appliques for exterior surface protection, aerodynamic drag resistance, or other purposes wherein the applique has an outer layer and a heating layer. Embodiments of the applique also include a heating layer comprising thermoplastic or thermosetting polymer and magnetic material, and an adhesive layer.

Another disclosed embodiment includes a system for installation or removal of appliques. Embodiments of the system include an applique having an outer layer, a heating layer of thermoplastic or thermosetting polymer and magnetic material, and an adhesive layer. Embodiments of the system also include a magnetic field source for generating a variable frequency magnetic field.

Embodiments of the disclosed system may also include using magnetic material with a Curie point temperature within a temperature range at which the adhesive bonds in the adhesive layer will de-bond. Likewise, embodiments may include a magnetic field source that generates a magnetic field selected to cause the magnetic material to reach a Curie point temperature within a temperature range at which the adhesive bonds in the adhesive layer will de-bond.

Also disclosed are embodiments of a method for manufacturing an applique. Some embodiments of the method include providing an outer layer, providing a heating layer comprising thermoplastic or thermosetting resin and magnetic material, and providing an adhesive layer. Other systems and methods also exist.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
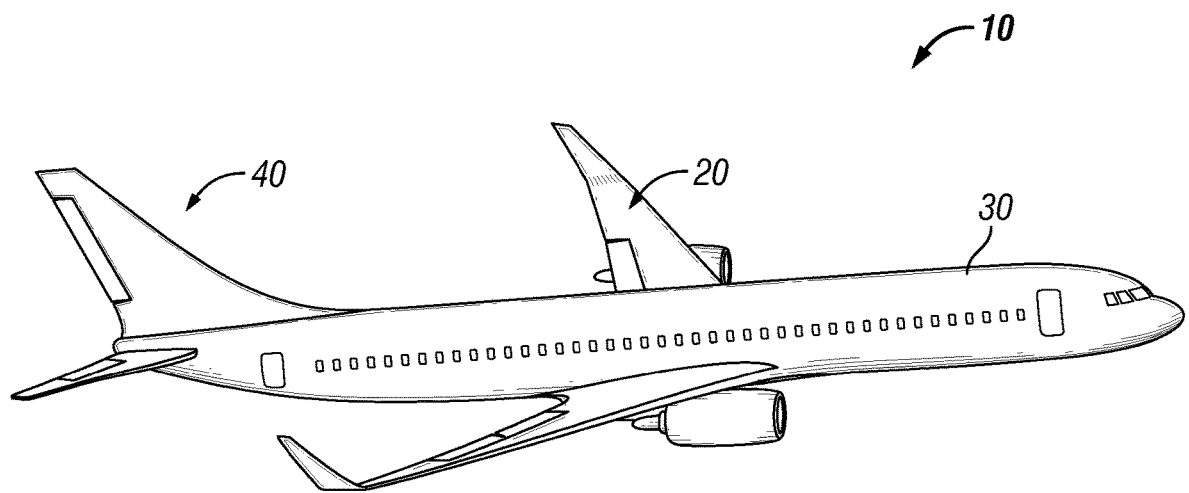
FIG. 1 shows some potential application areas on an aircraft 10 in accordance with some disclosed embodiments.

In aircraft applications, some possible areas of use for the applique material include the wing 20 for lightning protection, the fuselage 30 for shielding and lightning protection, and the empennage 40 for lightning protection. FIG. 1 shows some potential application areas on an aircraft 10 in accordance with some disclosed embodiments.

As discussed above, currently, adhesion issues associated with appliques exist and can vary with the adhesive used. PSA adhesives typically reduce or lose their tack at low temperatures and reduce their shear holding ability at high temperatures; special PSA adhesives are made to function at high or low temperatures (e.g., in temperature regimes ranging from approximately −65° F. thru approximately 180° F.). Thermosetting polymer adhesives have demonstrated the capability to perform well at these extremes, but do not, on their own, provide the desired de-bonding characteristics required when the film stackups must be removed/replaced. Thermoplastic adhesives are heat reactive, but the heating must be sufficiently controlled for effective adhesive application and removal.

Figure 2:
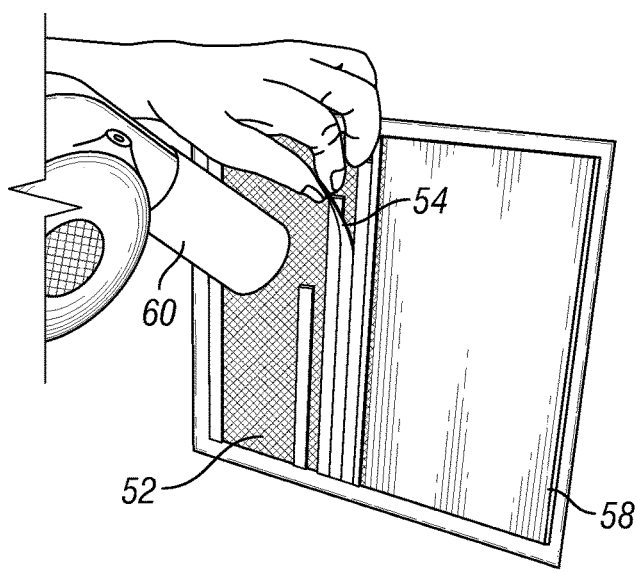
FIG. 2 illustrates some current techniques for removal of appliques.

FIG. 2 illustrates some current techniques for removal of appliques. Current techniques include slitting the applique material using a cutting tool (not shown) which preferably cuts the applique to a specific depth to alleviate the cutting into the structural materials 58. With the applique 52 cut into strips 54 it can be peeled off the structure 58 with considerable effort (e.g., by application of heat 60). Other techniques for applique removal are also possible.

As noted above, some advantages of using a metal/polymer lightning strike protection layer for lightning protection may include enabling a post-assembly process to cover a surface (e.g., prior to painting) and to provide a mechanisms to divert lightning current away from aircraft skin fasteners.

Some possible design approaches include applying an applique in a full-acreage format with a conductive layer applied over entire or large sections of an aircraft (e.g., a wing box) in order to route lightning current, for example, to the leading or trailing edges or wing root. In addition, a dielectric layer may be implemented to cover fasteners and any conductive features in critical sections.

Another possible design approach is to implement a strip format with both the applique conductive layer and dielectric layer applied substantially over the fasteners or other conductive features in critical sections while leaving other portions substantially uncovered. Such a design may, for example, direct surface current to the leading/trailing edges and wing root. Other design options also exist. Further, the applique dielectric and conductive layers (layer thickness, material type, layup configuration) can all be varied and configured to meet desired performance requirements (e.g., durability, functionality, or the like).

Other possible embodiments include using appliques for surface protection or for aerodynamic properties. In such cases, embodiments may include a surface layer with the appropriate properties (e.g., protective, aerodynamic, or the like), a heating layer, and an adhesive layer. In other embodiments the heating layer and the adhesive layer may be integrated into a single layer. Other configurations are also possible.

Accordingly, embodiments of the presently disclosed system include a heating layer which may comprise a thin thermoplastic or thermosetting polymer film loaded with non-polymeric inclusions that are susceptible to heating under a time-varying magnetic field. Insertion of this additional heating layer into a structural or semi-structural heterogeneous laminate provides an "on-demand" de-bonding site for laminate deconstruction. For example, in some embodiments when the heating layer is inserted between a cured Carbon-Fiber Reinforced Plastic (CFRP) layer and a Polymeric/Metallic film stackup layer, the heating layer can be selectively heated above its softening point (e.g., by using energy absorbed from a locally-applied time-varying magnetic field) to allow for ease of applique separation from the CFRP layer.

Figure 3:
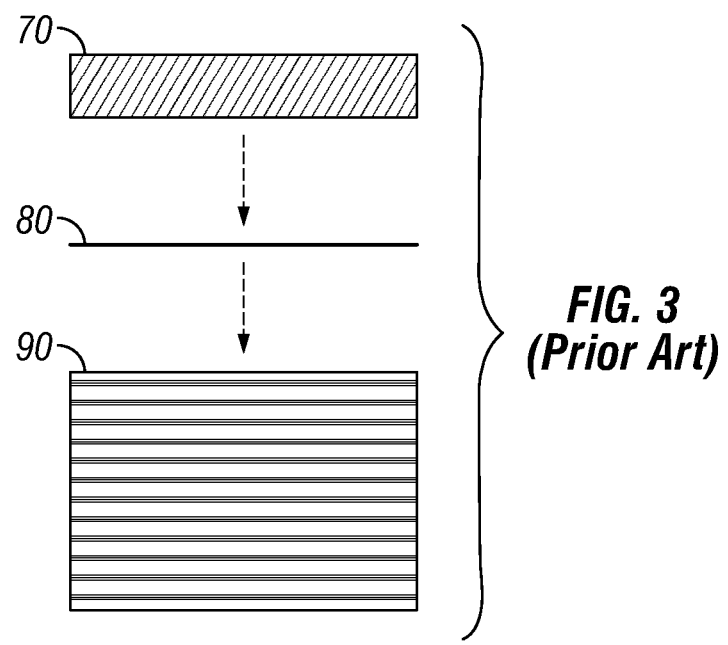
FIG. 3 illustrates a prior art system for appliques.

FIG. 3 illustrates a prior art system for some appliques. As illustrated, some embodiments of existing appliques may comprise a lightning strike protection (LSP) layer 70 that may further comprise a metallic conductor and a polymeric dielectric. As discussed, the LSP layer 70 may be adhered to a surface 90 which may comprise a CFRP laminate. For some embodiments, the applique may also comprise a pressure sensitive adhesive (PSA) layer 80. Other configurations for existing appliques are also possible.

Figure 4A:
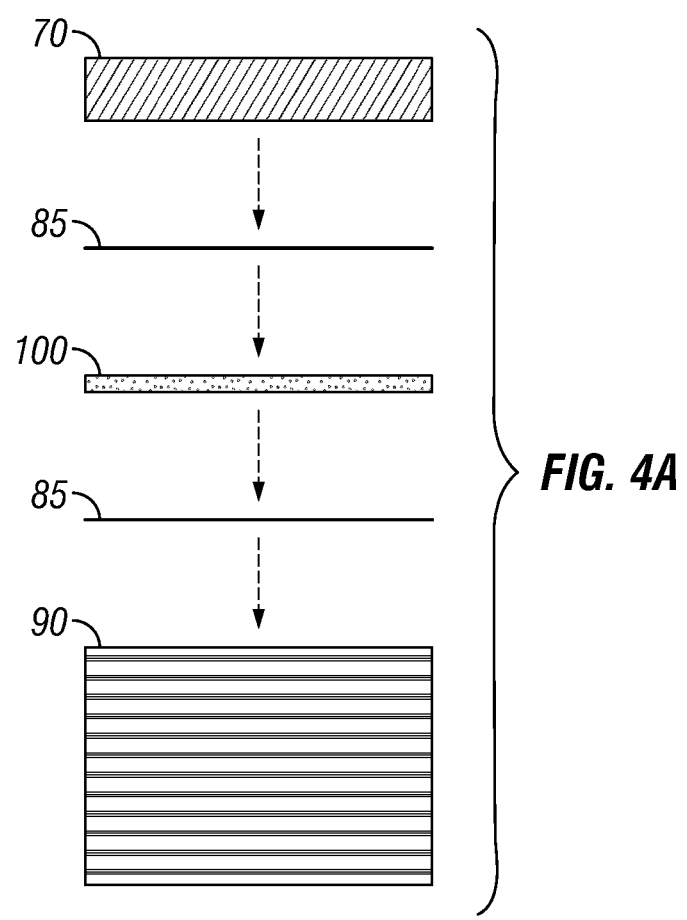
FIGS. 4A, 4B, and 4C illustrate embodiments of an applique in accordance with the present disclosure.
Figure 4B:
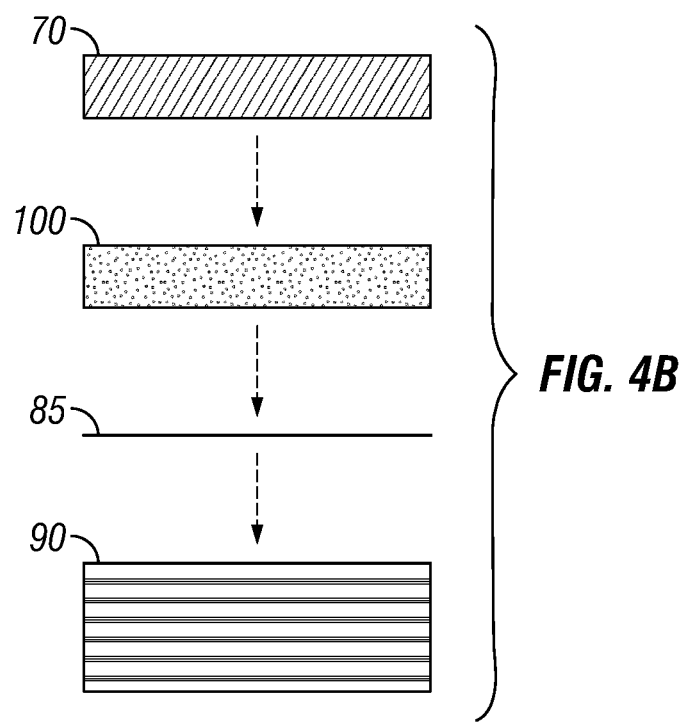
Figure 4C:
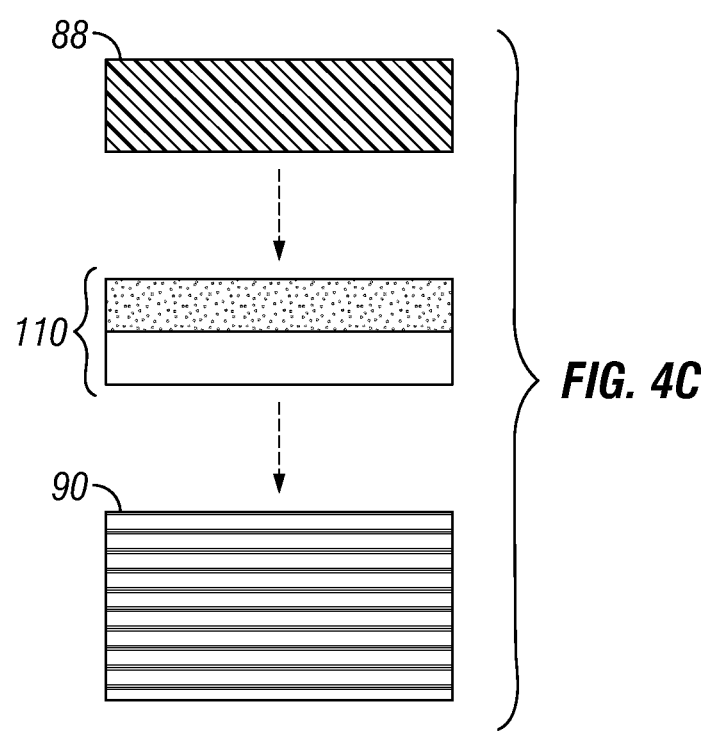

FIGS. 4A-4C illustrate embodiments of appliques in accordance with the present disclosure. The embodiment shown in FIG. 4A may comprise an LSP layer 70 that may be mounted to a surface 90, such as a CFRP surface of an aircraft. Embodiments may also comprise one or more adhesive layers 85 (e.g., thermosetting film adhesive (TSA) layers, PSA layers, thermoplastic adhesive layers, or the like). While two adhesive layers 85 are shown in FIG. 4A other configurations are also possible. For example, embodiments of an applique with a single adhesive layer 85 could be implemented. Embodiments of adhesive layers 85 may comprise an epoxy film, such as 250 degree ° F. curing epoxy film adhesive layers, which may be applied using a vacuum-bag heat blanket repair-style process, a PSA adhesive layer, or a thermoplastic adhesive layer. Other adhesive layers 85 are also possible.

Embodiments of the disclosed system may also comprise thermoplastic or thermosetting heating layer 100 comprising magnetic particles within. In some embodiments, heating layer 100 may be applied to an applique as an integral adhesive layer. In other embodiments, such as the ones shown in FIGS. 4A-4B, heating layer 100 may be integrated into the applique stackup using one or more adhesive layers 85. Some factors affecting whether the heating layer 100 is integral or layered with adhesive layers 85 may include economic factors, desired integration point factors (e.g., bonding of the LSP 70 layer occurring at a wing 20 assembly or during a final aircraft 10 assembly), as well as other factors.

As shown for the embodiment depicted in FIG. 4C, some appliques for uses such as surface protection, aerodynamics, or the like may comprise a surface layer 88 that covers the desired portion(s) of the surface 90. For the embodiment shown in FIG. 4C an integral adhesive and heating layer 110 is shown. Of course, other configurations, such as using separate adhesive layers 85 and heating layers 100 shown in FIGS. 4A-4B are also possible for these embodiments.

Embodiments of the heating layer 100 may comprise any suitable thermoplastic or thermosetting polymer or resin. For some embodiments and applications a softening point above 275° F. is desirable for in-service considerations, as well as, to allow for integration using 250 degree ° F. curing epoxy adhesives. For some embodiments, it is desirable to use a film with a reasonable mix of ductility and chemical resistance, and one which does not require an excessive temperature increase in order to soften/melt. Fluorinated thermoplastics such as Polyvinylidene fluoride (PVDF, Melt Point ~350° F.), Ethylene chlorotrifluoroethylene (ECTFE, Melt Point ~430° F.) or Fluorinated ethylene propylene (FEP, Melt Point ~500° F.) are all possible materials for use in heating layer 100. Other embodiments also exist.

Figure 5:
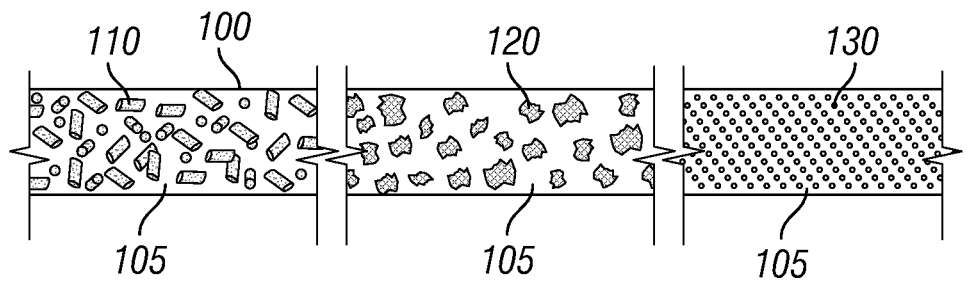
FIG. 5 is a cross-sectional illustration of alternative embodiments of heating layer 100 illustrating magnetic material 105 within.

Embodiments of heating layer 100 also comprise magnetic material 105 embedded in the thermoplastic or thermosetting polymer. FIG. 5 is a cross-sectional illustration of alternative embodiments of heating layer 100 illustrating magnetic material 105 within. In some embodiments, magnetic material 105 may comprise a magnetic alloy (e.g., a Ni—Fe alloy such as Alloy 30, Alloy 31, Alloy 32, Alloy 34, Alloy 36, or the like). In some embodiments it is desirable to select the magnetic material 105 with a Curie point temperature that is in the range of the adhesive layer 85 softening temperature.

In addition, magnetic material 105 may be incorporated into heating layer 100 in any suitable manner. For example, magnetic material 105 may comprise chopped fibers 111, flakes 120, small particles 130, or the like. In some embodiments magnetic material 105 may comprise ⅛ inch long, 1 mil diameter chopped alloy wires compatible with adhesive films and with composite structure. The magnetic material 105 may be mixed with adhesive at a few percent by volume. Other embodiments are also possible.

Figure 6:
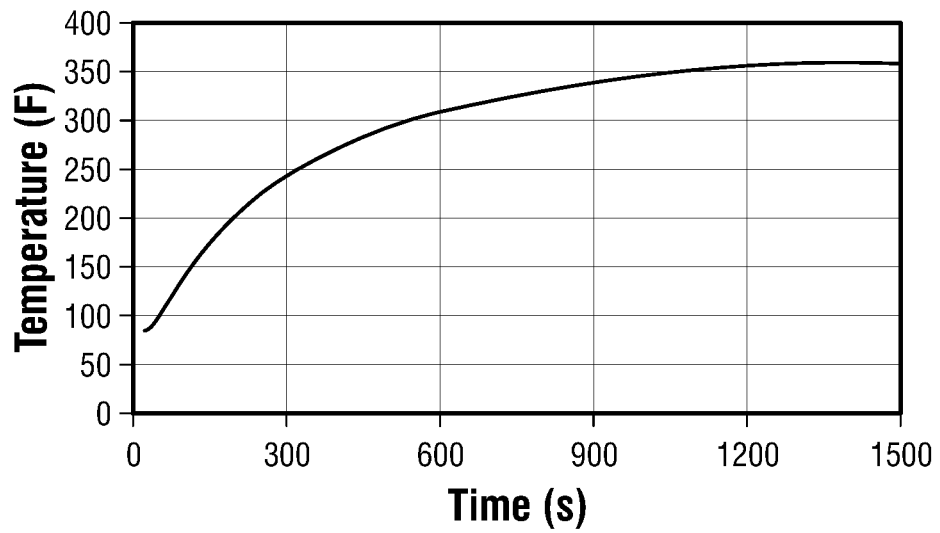
FIG. 6 is a plot of temperature over time for the application of a varying frequency magnetic field to a magnetic material 105.

Embodiments of methods to implement the disclosed system are as follows. It is known that application of a varying frequency magnetic field will cause some magnetic materials 105 to generate heat. Typically, the magnetic material 105 will heat up until it reaches a temperature determined by its Curie point. After that Curie point is reached, the heat generated by the magnetic material 105 levels off even if continued application of the varying frequency magnetic field persists. This is illustrated in FIG. 6 which is a plot of temperature over time for the application of a varying frequency magnetic field to a magnetic material 105. By selecting a magnetic material 105 with a Curie point temperature in the range of the softening point for adhesive layer 85, then application of a varying magnetic field will generate heat in the magnetic material 105 and consequently soften the bonding of the adhesive layer 85.

An exemplary heating using a varying magnetic field to soften loaded adhesive may be carried out as follows. A heating layer 100 is fabricated using a resin and Alloy 36. A spiral coil is used to create a varying magnetic field. In one embodiment the varying field of 15 kHz, 20 mT is generated uniformly using a AC source generator and a spiral coil. Other coils or methods of generating the varying magnetic field may be also implemented. The heat production in the heating layer 100 is measured over time (resulting in a plot similar to FIG. 6). An applique of the heating layer 100 and adhesive layer 85 is constructed and when the varying magnetic field is applied, sufficient softening of the adhesive layer 85 occurs to de-bond the applique. Other methods of de-bonding through application of a varying magnetic field may also be used.

In this manner, selective heating of a loaded heating layer 100 provides for a very rapid and control de-bonding of two substrates bonded by that layer. Further, implementation of the above described method also enables direct heating of the heating layer 100 only without overheating the polymer or substrates (e.g., surface 90). This is due to the fact that the heating layer 100 will stabilize at the limit temperature due to Curie point (e.g., as shown in FIG. 6). Embodiments of the disclosed system and method have also been found to operate relatively quickly and adhesive layers 85 have been found to heat to the selected Curie temperature (150° F., 350° F., 450° F., etc.) in about 3 minutes. Implementation of the disclosed systems and methods also allows de-bonding of appliques without the need to implement finicky and time-consuming heat blankets to de-bond adhesive layers.

In some embodiments, the varying magnetic field may be created using a hand-held coil, a robotically operated coil, or some other form of field generating mechanisms to heat the thermoplastic layer 100. Then, as the adhesive layer 85 softens, the LSP layer 70, or surface layer 88, may be removed, repaired, or replaced by peeling or the like.

Figure 7:
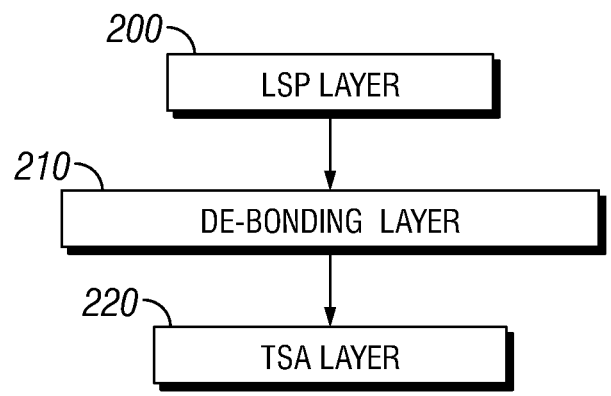
FIG. 7 is a flow diagram illustrating one embodiment of a method to manufacture an applique in accordance with the present disclosure.

FIG. 7 is a flow diagram illustrating one embodiment of a method to manufacture an applique in accordance with the present disclosure. As shown at 200, a lightning strike protection (LSP) layer (e.g., LSP layer 70) may be included as part of an applique. At 210 a heating layer (e.g., heating layer 100) may be coupled to the LSP layer to form part of an applique stack. At 220 an adhesive layer (e.g., TSA layer, PSA layer, thermoplastic layer, etc.) may be coupled to the applique stack. While, the above-described embodiment implies an order to the manufacture of the applique layers, the present disclosure is not so limited and any other ordering of the creation of the applique layers may be implemented.

This invention provides improved mechanical properties over the entire temperature range of interest while still supporting and improving on the removability characteristics provided by the current approach.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method comprising:
   applying a varying magnetic field to a heating layer of an applique bonded to a surface of an aircraft by an adhesive layer adjacent to the heating layer, the heating layer comprising a resin and a magnetic material;
   continuing to apply the varying magnetic field to the heating layer at least until a temperature of the heating layer stabilizes at a Curie point of the magnetic material, wherein an adhesive layer adjacent to the heating layer is sufficiently softened at the Curie point to debond the applique from the surface, and wherein the varying magnetic field has a magnetic induction of 20 mT; and
   removing the applique from the surface of the aircraft.

2. The method of claim 1, wherein the varying magnetic field has a frequency of 15 kHz.

3. The method of claim 1, wherein the Curie point is 150° F.

4. The method of claim 1, wherein the varying magnetic field is applied by a robotically operated coil.

5. The method of claim 1, wherein the heating layer is adapted to heat to the Curie point within 3 minutes in the presence of the varying magnetic field.

6. The method of claim 1, wherein the Curie point is 350° F.

7. The method of claim 1, wherein the Curie point is 450° F.

8. The method of claim 1, wherein the applique is a lightning strike protection layer.

9. The method of claim 8, wherein the lightning strike protection layer comprises a conductor layer and a dielectric layer.

10. The method of claim 1, wherein the surface of the aircraft is a surface of a carbon-fiber reinforced plastic layer of the aircraft.

11. The method of claim 1, further comprising:
    coupling the applique with the heating layer;
    coupling the adhesive layer with the heating layer; and
    adhering the applique to the surface of the aircraft using the adhesive layer.

12. The method of claim 1, wherein the adhesive layer is coupled with a first surface of the heating layer, the method further comprising coupling a second adhesive layer on a surface of the heating layer that is adjacent to the applique.

13. The method of claim 1, further comprising including an alloy in the magnetic material.

14. The method of claim 13, wherein the alloy that is included in the magnetic material is a nickel-iron alloy.

15. The method of claim 1, wherein the magnetic material is particulate material.

16. The method of claim 15, wherein the particulate material includes chopped fiber wire or flaked material.

17. A method comprising:
    applying a varying magnetic field to a surface of a lightning strike protection layer adhered to a surface of an aircraft by a first adhesive layer and a second adhesive layer, wherein a heating layer is positioned between the first adhesive layer and the second adhesive layer, wherein the varying magnetic field causes the heating layer to heat;
    continuing to apply the varying magnetic field to the heating layer at least until a temperature of the heating layer stabilizes at a Curie point of a magnetic material of the heating layer, wherein the first adhesive layer and the second adhesive layer are sufficiently softened at the Curie point to debond the lightning strike protection layer from the surface of the aircraft; and
    removing the lightning strike protection layer from the surface of the aircraft.

18. The method of claim 17, wherein the varying magnetic field has a frequency of 15 kHz and a magnetic inductance of 20 mT.

19. The method of claim 17, wherein the Curie point is 150° F., 350° F., or 450° F.

20. The method of claim 17, wherein the varying magnetic field is applied by a robotically operated coil.

* * * * *